United States Patent
Son et al.

(10) Patent No.: US 8,160,358 B2
(45) Date of Patent: Apr. 17, 2012

(54) METHOD AND APPARATUS FOR GENERATING MOSAIC IMAGE

(75) Inventors: Byung-Jun Son, Seoul (KR); Tae-Hwa Hong, Seoul (KR); Soo-Kyun Kim, Seoul (KR); Sung-Dae Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 665 days.

(21) Appl. No.: 12/391,867

(22) Filed: Feb. 24, 2009

(65) Prior Publication Data

US 2009/0214110 A1    Aug. 27, 2009

(30) Foreign Application Priority Data

Feb. 26, 2008    (KR) .................. 10-2008-0017305

(51) Int. Cl.
*G06K 9/34*    (2006.01)
(52) U.S. Cl. .................................................. 382/175
(58) Field of Classification Search .................. 382/164, 382/172, 175, 284; 358/530
See application file for complete search history.

(56) References Cited

U.S. PATENT DOCUMENTS

| 5,617,224 A | * | 4/1997 | Ichikawa et al. | ............... 358/530 |
| 6,928,194 B2 | * | 8/2005 | Mai et al. | ..................... 382/284 |

FOREIGN PATENT DOCUMENTS

| JP | 11-345309 | 12/1999 |
| JP | 11-345311 | 12/1999 |
| JP | 11-345313 | 12/1999 |

* cited by examiner

*Primary Examiner* — Duy M Dang
(74) *Attorney, Agent, or Firm* — The Farrell Law Firm, P.C.

(57) ABSTRACT

A method and apparatus for generating a mosaic image by mosaic processing of an image are provided, in which an object to be used in a mosaic is acquired from a received image, the object is stored in a storage medium, a target image to be mosaic-processed is received, a mosaic block size is set, at least one object selected from among objects stored in the storage medium is received for use as a mosaic block, the target image is divided into a plurality of areas each having the mosaic block size, and the object is set as a mosaic block by reflecting a color of each divided area in the object.

12 Claims, 6 Drawing Sheets

METHOD AND APPARATUS FOR GENERATING MOSAIC IMAGE

PRIORITY

This application claims priority under 35 U.S.C. §119(a) to a Korean Patent Application filed in the Korean Intellectual Property Office on Feb. 26, 2008 and assigned Serial No. 10-2008-17305, the entire disclosure of which is hereby incorporated by reference.

BACKGROUND OF THE INVENTION

1. Field of the Invention

The present invention generally relates to a method for generating a mosaic image. More particularly, the present invention relates to a method for generating a mosaic image in an electronic device with a limited-capacity storage medium and computation capability.

2. Description of the Related Art

Mosaic images find their use in a variety of applications including advertisements, movies, and animations. For creating a mosaic image, non-photorealistic rendering is popular. The non-photorealistic rendering technique uses various objects taking the form of tiles, stored in a database. That is, an original image is divided into a plurality of areas and the divided areas are replaced with various objects in a tiling process, taking into account the correlation between the objects and the divided areas in terms of image characteristics such as colors, edges, and texture. The non-photorealistic rendering technique requires objects in shapes and sizes for application to the divided areas (i.e. mosaic blocks). Moreover, a database for storing the objects is also required.

Along with the recent proliferation of portable terminals such as mobile terminals, more and more people are conducting voice or data communications through portable terminals. As the portable terminal is viewed as a personalized device, it is added with diverse functions for acting as an MP3 player, a camera, a video player, an electronic dictionary, a game player, etc, thus serving as a multimedia device. Further, users want more functions for the portable terminal, for various uses. To meet the user's demand, portable terminal manufacturers have expended great amounts of effort to develop differentiated, versatile portable terminals. In this context, attempts are made to apply a conventional mosaic image generation method to a portable electronic device such as a mobile terminal.

A portable terminal like a mobile terminal is usually equipped with a limited-capacity memory as a database. Considering the environment of the portable terminal, that is, the limited-capacity memory, a small number of objects are stored in the memory and the conventional mosaic image generation method has been implemented using the objects. However, there are limitations in reflecting the characteristics of areas divided from an original image using limited resources (i.e. objects) and the resulting mosaic image is less complete. In addition, the use of the limited number of objects makes it difficult to expect a mosaic image that fully reflects a user's requirement.

Extraction of an object most approximate to a divided area of the original image in terms of characteristics takes a large volume of computation for the object search and comparison. Since a portable terminal with a lower computation capability takes a long time to extract such an object, its user is required to should wait a long time until a mosaic image is completed.

SUMMARY OF THE INVENTION

An aspect of the present invention is to address at least the problems and/or disadvantages and to provide at least the advantages described below. Accordingly, an aspect of the present invention is to provide a method and apparatus for generating a mosaic image with a high level of artistic completeness in an electronic device with a limited-capacity memory and computation capability.

Another aspect of the present invention provides a method and apparatus for generating a mosaic image using a user-desired object.

Accordingly, there is provided a method for generating a mosaic image by mosaic processing of an image, in which an object to be used in a mosaic is acquired from a received image, the object is stored in a storage medium, a target image to be mosaic-processed is received, a mosaic block size is set, at least one object selected from among objects stored in the storage medium is received for use as a mosaic block, the target image is divided into a plurality of areas each having the mosaic block size, and the object is set as a mosaic block by reflecting a color of each divided area in the object.

During the setting of the object as a mosaic block, representative values of a signal indicating colors of each divided area can be acquired, the representative values of a signal indicating colors of each divided area can be reflected in the object to be applied to the each divided area, and the object reflecting the representative values of a signal indicating colors of each divided area can be set as a mosaic block.

The signal indicating colors can be a color signal including Red (R), Green (G) and Blue (B).

During the representative values acquisition, histograms of R, G, and B values of the extracted object or the each divided area can be computed, and level values having highest proportions in the histograms can be set as representative values of the R, G, and B colors.

There is also provided an apparatus for performing mosaic processing on an original image, in which an object image extractor extracts an object to be used in a mosaic from a selected area of an image, an object modeler analyzes a property of the object received from the object image extractor and stores information about the property of the object in a storage medium, an image analyzer analyzes an image property for each divided area of the original image, and a mosaic image generator receives at least one object selected from among objects stored in the storage medium and generates a mosaic image by reflecting the image property of each divided area in the selected object.

It is preferred that the object modeler acquires representative values of a signal indicating colors of the object, and sets a color property for the extracted object by combining the representative values.

It is preferred that the image analyzer acquires representative values of a signal indicating colors of each divided area and the mosaic image generator generates a mosaic block by reflecting the representative values of the signal indicating colors of the each divided area in the selected object.

The object modeler can compute histograms of R, G, and B values of the extracted object and set level values having highest proportions in the histograms as representative values of the R, G, and B colors of the object, and the image analyzer can compute histograms of R, G, and B values of each divided area and set level values having highest proportions in the histograms as representative values of the R, G, and B colors of each divided area.

BRIEF DESCRIPTION OF THE DRAWINGS

The above and other objects, features and advantages of the described embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
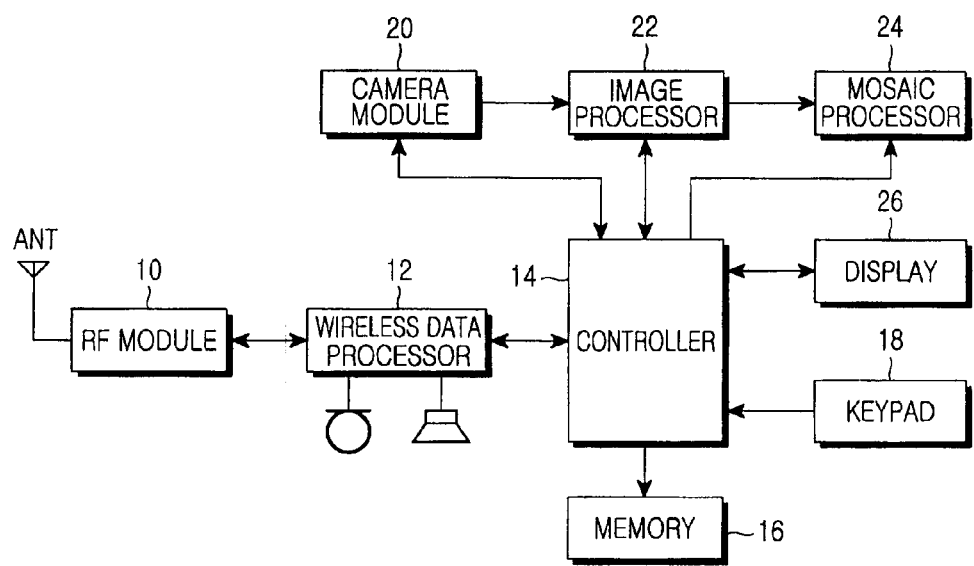
FIG. 1 is a block diagram of a portable terminal having a mosaic image processing apparatus according to an embodiment of the present invention.

FIG. 1 is a block diagram of a portable terminal having a mosaic image processing apparatus according to an embodiment of the present invention. The following description will be made of a hardware device in the context of a portable terminal, by way of example, as one of various devices for processing an externally input image to a mosaic image according to the present invention.

Referring to FIG. 1, a portable terminal for converting a digital image to a mosaic image and displaying the mosaic image includes a camera 20, an image processor 22, a mosaic processor 24, a display 26, a controller 14, a memory 16, a keypad 18, a Radio Frequency (RF) module 10, and a wireless data processor 12.

The RF module 10 modulates voice, text, and control data from a user to an RF signal and transmits the RF signal to a Base Station (not shown) over a mobile communication network. The RF module 10 also receives an RF signal from the BS, modulates the RF signal to voice, text, or control data, and outputs the modulated data. The wireless data processor 12 decodes voice data received from the RF module 10 and outputs the decoded data as audible sound through a speaker under the control of the controller 14. The wireless data processor 12 also converts a voice signal received from the user through a microphone to data, outputs the data to the RF module 10, and provides text and control data received from the RF module 10 to the controller 14.

The camera 20 serves as a typical digital camera under the control of the controller 14 and captures visible light incident from an external target object. The image processor 22 converts image data received from the camera 20 to digital image data of an appropriate format.

The keypad 18 is used for receiving phone numbers or characters from the user. It includes alphanumerical keys with which to enter digits and characters and functions keys with which to set functions. The keypad 18 provides a key input signal to the controller 14. The display 26 may include a display device such as a Liquid Crystal Display (LCD). Under the control of the controller 14, the display 26 displays messages indicating operation statuses of the terminal and the captured digital image data.

The controller 14 provides overall control to the portable terminal by controlling functional components. That is, the controller 14 processes numbers and a menu selection signal received from the keypad 18, processes an external captured signal received through the camera 20, and outputs an image output signal required for operations, including a camera-captured image, to the display 26. The controller 14 also receives an external mosaic request and controls the operation of the mosaic processor 24. When needed, the controller 14 retrieves or stores data from or in the memory 16. The memory 16 stores a number of programs and data associated with the operation of the controller 14 and stores information required for using the portable terminal.

The portable terminal having the above-described configuration performs typical operations associated with mobile communication services. Aside from these functions, the controller 14 converts an image to a mosaic according to the present invention. In addition, the memory 16 stores an operation program for mosaic processing of an image and associated information. When needed, the memory 16 outputs the stored information to the controller 16. Upon receipt of a request for extracting an object for mosaic processing of an image, the mosaic processor 24 extracts a particular object from an image captured by the camera or received from an external electronic device, analyzes the property of the extracted object, and stores information about the property according to the present invention. Upon receipt of a mosaic request, the mosaic processor 24 analyzes the pixels of a target image or blocks divided from the target image and processes the target image to a mosaic image using an object reflecting the property of each pixel or each block.

Figure 2:
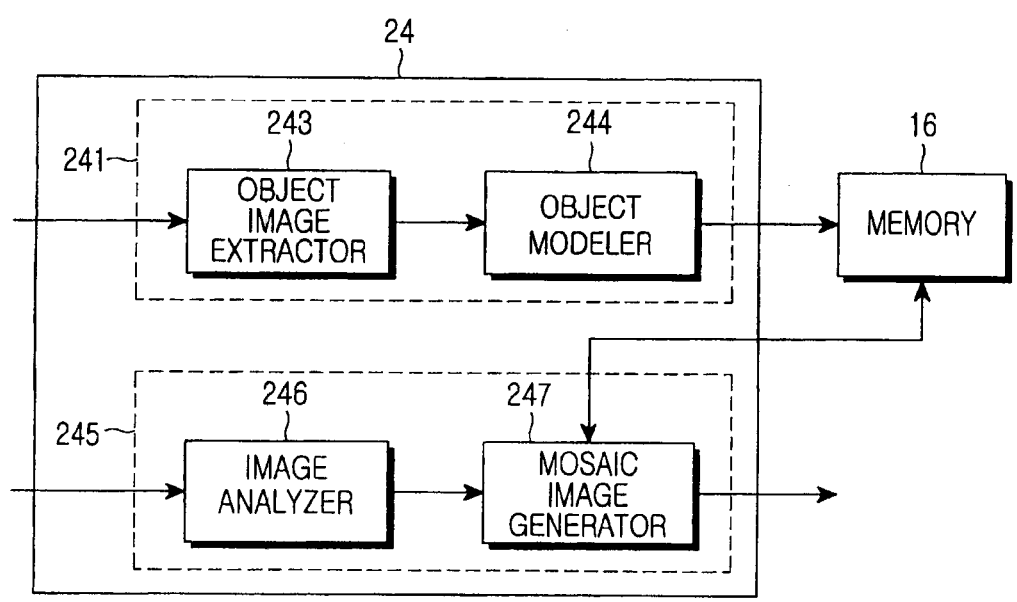
FIG. 2 is a detailed block diagram of a mosaic processor according to an embodiment of the present invention.

FIG. 2 is a detailed block diagram of the mosaic processor according to an embodiment of the present invention. Referring to FIG. 2, a mosaic processor 24 according to the embodiment of the present invention includes an object modeling module 241 and a mosaic image processing module 245.

Figure 3:
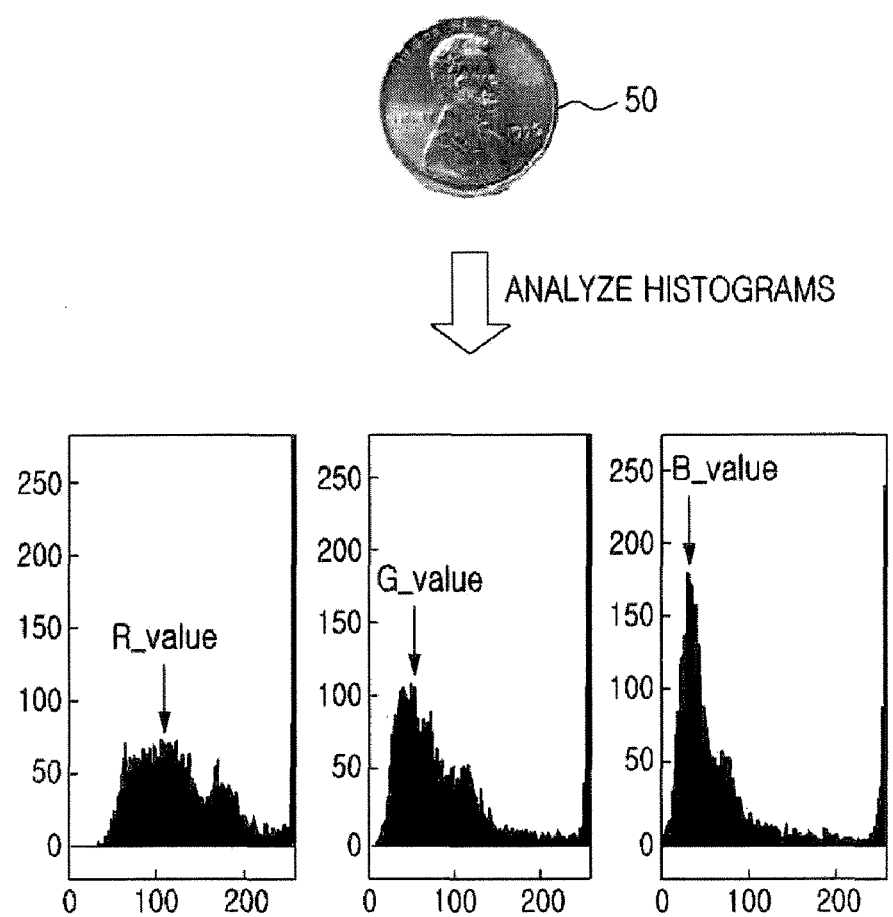
FIG. 3 illustrates exemplary results of computing the histograms of an object in a mosaic image generation method according to an embodiment of the present invention.

The object modeling module 241 operates upon receipt of an object extraction request. The object modeling module 241 includes an object image extractor 234 for extracting an object-including area from an external input image and an object modeler 244 for modeling the object using the extracted area. The object modeler 244 determines the property of the object by analyzing the histograms of the object for colors. Preferably, the object modeler 244 computes the histograms of colors of the object, i.e. Red (R), Green (G), and Blue (B) colors, sets level values having the highest proportions in the histograms as representative values of the R, G and B colors, and determines a combination of the representative values as the property of the object. For example, as illustrated in FIG. 3, level values having the highest proportions in the RGB histograms of the coin 50 given as an object are set as the representative values of R, G and B colors, R value, G_value and B_value. A combination of the representative values of the colors is determined as the property of the object.

The object modeler 244 can determine the property of the object using Equation (1) using the representative values of the colors.

$$R\_model = \begin{cases} 0 & \text{if } R\_Objimg - R\_value \leq 0 \\ R\_Objimg - R\_value & \text{if } R\_Objimg - R\_value < 255 \\ 255 & \text{if } 255 \leq R\_Objimg - R\_value \end{cases} \quad (1)$$

$$G\_model = \begin{cases} 0 & \text{if } G\_Objimg - G\_value \leq 0 \\ G\_Objimg - G\_value & \text{if } G\_Objimg - G\_value < 255 \\ 255 & \text{if } 255 \leq G\_Objimg - G\_value \end{cases}$$

$$B\_model = \begin{cases} 0 & \text{if } B\_Objimg - B\_value \leq 0 \\ B\_Objimg - B\_value & \text{if } B\_Objimg - B\_value < 255 \\ 255 & \text{if } 255 \leq B\_Objimg - B\_value \end{cases}$$

where R_value, G_value and B_value denote the representative values of the colors, respectively, R_Objimg, G_Objimg and B_Objimg denote the R, G and B components of each object image, respectively, and R_mod el, G_mod el and B_mod el denote the properties of the respective colors of the object.

The object modeler 244 stores information about the property of the object in the memory 16.

The mosaic image processing module 245 operates upon receipt of a mosaic request. The mosaic image processing module 245 includes an image analyzer 246 for analyzing the property of each pixel or each divided block of an external input image and a mosaic image generator 247 for processing the image to a mosaic using the object generated from the object modeler 244.

To be more specific, the image analyzer 246 divides the target image to be processed to a mosaic image into areas each having a predetermined size and computes the RGB histograms of each divided area. Then the image analyzer 246 sets representative values $R_b$_value, $G_b$_value and $B_b$_value for each divided area based on level values having the highest proportions in the R, G and B colors.

The mosaic image processing module 247 retrieves the information about the color properties of the object R_mod el, G_mod el and B_mod el from the memory 16 and receives the representative values of each divided area $R_b$_value, $G_b$_value and B_value from the image analyzer 246. The mosaic image processing module 247 reflects the colors indicated by the representative values $R_b$_value, $G_b$_value and $B_b$_value in the object and applies the resulting object to a mosaic block. The reflection of the colors of each divided area can be performed based on Equation (2).

$$R\_Block = \begin{cases} R\_model + R_b\_value, & \text{if } R\_model + R_b\_value < 255 \\ 255, & \text{if } 255 \leq R\_model + R_b\_value \end{cases} \quad (2)$$

$$G\_Block = \begin{cases} G\_model + G_b\_value, & \text{if } G\_model + G_b\_value < 255 \\ 255, & \text{if } 255 \leq G\_model + G_b\_value \end{cases}$$

$$B\_Block = \begin{cases} B\_model + B_b\_value, & \text{if } B\_model + B_b\_value < 255 \\ 255, & \text{if } 255 \leq B\_model + B_b\_value \end{cases}$$

where R_mod el, G_mod el and B_mod el denote the color (RGB) properties of the object modeled in step 100, respectively, $R_b$_value, $G_b$_value and $B_b$_value denote the representative values for each divided area based on level values having the highest proportions in the R, G and B colors, and R_Block, G_Block and B_Block denote R, G and B components of the object to be applied to a mosaic block, respectively.

A portable terminal having the above-described mosaic processor according to the embodiment of the present invention can generate a mosaic image reflecting a user-desired object. Also, a mosaic image with a high level of completeness can be generated without the need for storing objects in various shapes and/or types in a portable terminal with a limited-capacity memory.

Now the mosaic image generation operation according to the present invention will be described below.

Figure 4:
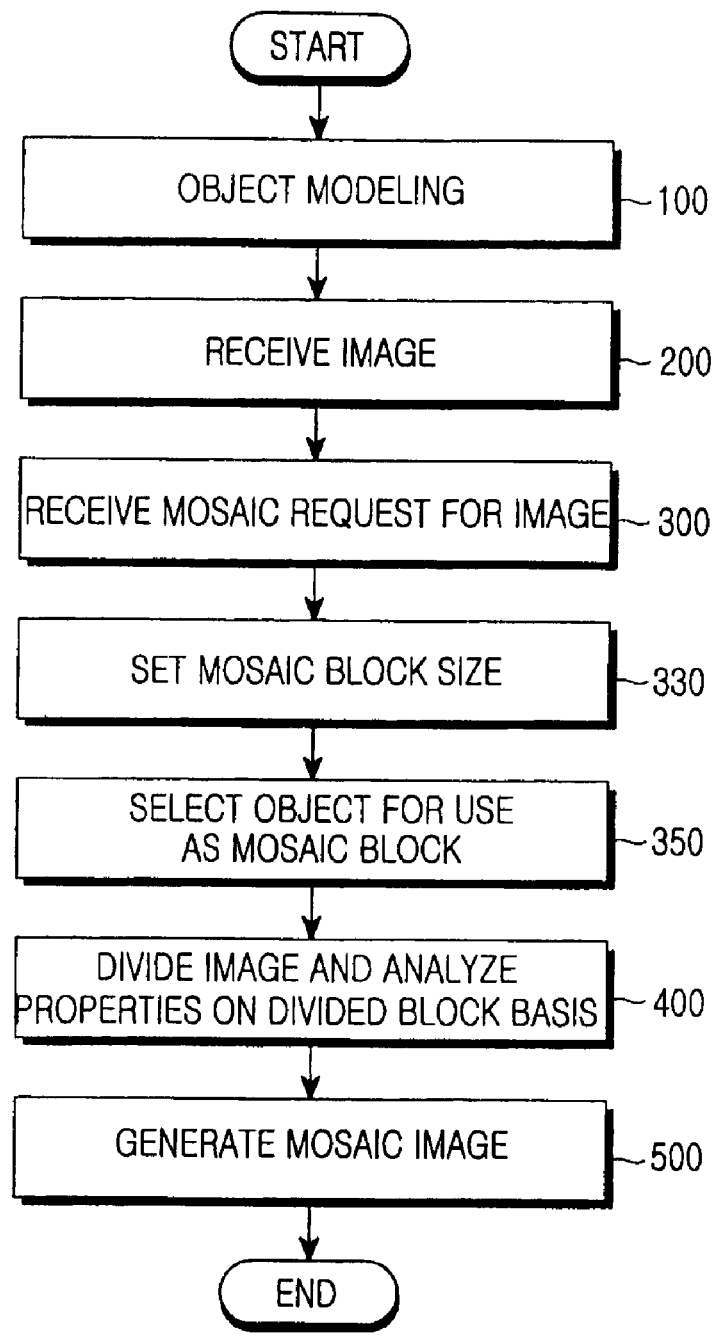
FIG. 4 is a flowchart sequentially illustrating the mosaic image generation method according to the embodiment of the present invention.

FIG. 4 is a flowchart sequentially illustrating the mosaic image generation method according to an embodiment of the present invention. Referring to FIG. 4, an object for use as a mask block to a mosaic is modeled prior to mosaic processing of an image in step 100. To be more specific, step 100 can be performed when a so-called 'mosaic object modeling generation mode' menu is selected from among menu items for setting various functions, for example, from among submenus of a camera capture menu in the portable terminal. Upon selection of the 'mosaic object modeling generation mode' menu, the portable terminal provides the user with an environment in which to select an object included in a stored image or an image received from a camera, analyzes the property of a user-selected object, and stores information about the analyzed property of the object.

The property of the object can be determined by analyzing the histograms of the object for colors. Preferably, the RGB histograms of the object are computed and level values having the highest proportions in the R, G and B colors are set as representative values of the R, G and B colors in relation to the property of the object. For example, as illustrated in FIG. 3, level values having the highest proportions in the RGB histograms of the coin 50 given as an object are set as the representative values of R, G and B colors, R_value, G_value and B_value. A combination of the representative values of the colors is determined as the property of the object.

Further, the property of the object can be determined using the color representative values in step 100, preferably by Equation (3).

$$R\_model = \begin{cases} 0 & \text{if } R\_Objimg - R\_value \leq 0 \\ R\_Objimg - R\_value & \text{if } R\_Objimg - R\_value < 255 \\ 255 & \text{if } 255 \leq R\_Objimg - R\_value \end{cases} \quad (3)$$

$$G\_model = \begin{cases} 0 & \text{if } G\_Objimg - G\_value \leq 0 \\ G\_Objimg - G\_value & \text{if } G\_Objimg - G\_value < 255 \\ 255 & \text{if } 255 \leq G\_Objimg - G\_value \end{cases}$$

$$B\_model = \begin{cases} 0 & \text{if } B\_Objimg - B\_value \leq 0 \\ B\_Objimg - B\_value & \text{if } B\_Objimg - B\_value < 255 \\ 255 & \text{if } 255 \leq B\_Objimg - B\_value \end{cases}$$

where R_value, G_value and B_value denote the representative values of the colors, respectively, R_Objimg, G_Objimg and B_Objimg denote the R, G and B components of each object image, respectively, and R_mod el, G_mod el and B_mod el denote the properties of the respective colors of the object.

Figure 5A:
FIG. 5A illustrates exemplary objects extracted in the mosaic image generation method according to the embodiment of the present invention.
Figure 5B:
FIG. 5B illustrates exemplary objects modeled in the mosaic image generation method according to the embodiment of the present invention.

FIG. 5A illustrates exemplary objects extracted in the mosaic image generation method according to an embodiment of the present invention and FIG. 5B illustrates exemplary objects modeled in the mosaic image generation method according to an embodiment of the present invention. The objects illustrated in FIG. 5A are ones extracted from an external input image including objects in step 100 and the objects illustrated in FIG. 5B are ones modeled using the color representative values R_value, G_value and B_value of the extracted objects and the RGB components R_Objimg, G_Objimg and B_Objimg of the extracted objects.

An image captured by the camera or an image received by wired or wireless communications can be stored in the memory of the portable terminal. In step 200 of FIG. 4, one of images stored in the memory is selected or an image captured by the camera in real time is received.

In step 300, a mosaic request for the input image is received. Specifically, during the display of the image received or selected in step 200, a 'mosaic image generation module' menu, for example, can be selected from among menu items provided for modifying an image in various manners in step 300. A configuration and an operation program for displaying menu items for menu selection and confirming key input from a user through the keypad are prepared beforehand in the portable terminal.

Step 300 may be followed by step 330 in which a mosaic block size is set to divide the image into a plurality of areas. The user can select a mosaic block size using a menu in the portable terminal in step 300. While the user selects a mosaic block size in step 330 according to the embodiment of the present invention, to which the present invention is not limited, it is further contemplated that the mosaic block size can be set to correspond with the size of an object to be inserted in a mosaic block.

If the portable terminal is capable of storing a plurality of objects, step 350 can further be performed to select an object for use as a mosaic block. In step 350, a plurality of objects are displayed on a display of the portable terminal and one of the objects is selected.

In step 400, the image to be mosaic-processed is divided into a predetermined areas each having a predetermined size, the RGB histograms of each divided area are computed, and level values having the highest proportions in the R, G and B colors are set as representative values, $R_b\_value$, $G_b\_value$ and $B_b\_value$ for the colors.

In step 500, the colors of each divided area are reflected in the color properties of an object to be applied as a mosaic block among objects modeled in step 100. The resulting object with its property and the colors of the divided area reflected therein is applied as a mosaic block. Preferably, the color reflection of each divided area can be determined according to Equation (4).

$$R\_Block = \begin{cases} R\_model + R_b\_value, & \text{if } R\_model + R_b\_value < 255 \\ 255, & \text{if } 255 \le R\_model + R_b\_value \end{cases}$$

$$G\_Block = \begin{cases} G\_model + G_b\_value, & \text{if } G\_model + G_b\_value < 255 \\ 255, & \text{if } 255 \le G\_model + G_b\_value \end{cases}$$

$$B\_Block = \begin{cases} B\_model + B_b\_value, & \text{if } B\_model + B_b\_value < 255 \\ 255, & \text{if } 255 \le B\_model + B_b\_value \end{cases} \quad (4)$$

where R_mod el, G_mod el and B_mod el denote the color (RGB) properties of an object modeled in step 100, respectively, $R_b\_value$, $G_b\_value$ and $B_b\_value$ denote the representative values for each divided area based on level values having the highest proportions in the R, G and B colors, and R_Block, G_Block and B_Block denote R, G and B components of the object to be applied to a mosaic block, respectively.

Figure 6:
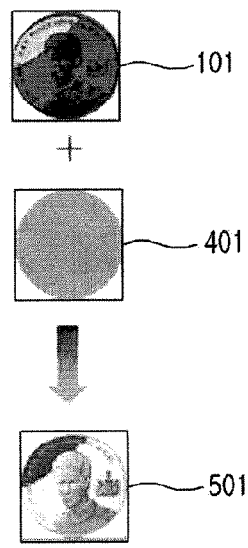
FIG. 6 illustrates an exemplary object to be used as a mosaic block in the mosaic image generation method according to the embodiment of the present invention.
Figure 7:
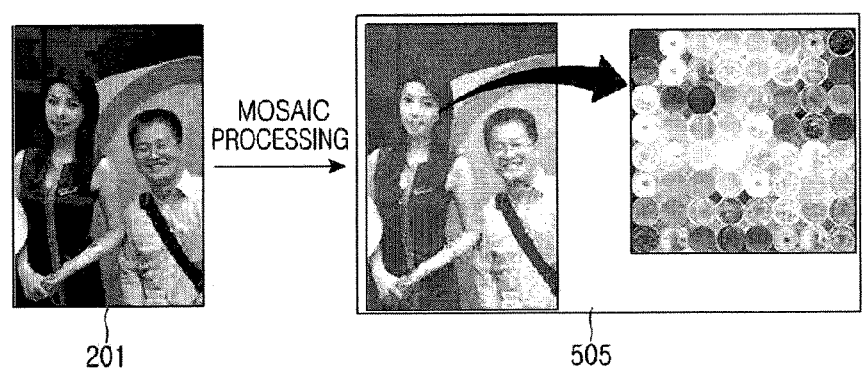
FIG. 7 illustrates an exemplary mosaic image generated in the mosaic image generation method according to the embodiment of the present invention.

FIG. 6 illustrates an exemplary object to be used as a mosaic block in the mosaic image generation method according to an embodiment of the present invention and FIG. 7 illustrates a mosaic image generated in the mosaic image generation method according to an embodiment of the present invention. The color 401 of a divided block is reflected in an object 101 modeled in step 100, thus creating an object 501 for use as a mosaic block in FIG. 6. An image 505 is generated by applying mosaic blocks to an externally received image 201 in FIG. 7.

As is apparent form the above description, the mosaic image generation method of the present invention can effectively reflect the image property of an original image in an electronic device with a limited-capacity storage medium and computation capability.

Since a mosaic image is created using a user-desired object in an electronic device having a limited-capacity memory, a portable terminal using a limited-capacity memory can generate a mosaic image with a high level of completeness without the need for storing objects in various sizes and/or types. While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for generating a mosaic image by mosaic processing of an image, comprising:
    acquiring from a received image an object to be used in a mosaic;
    storing the object in a storage medium;
    receiving a target image to be mosaic-processed and setting a mosaic block size;
    receiving at least one object selected from among objects stored in the storage medium, for use as a mosaic block;
    dividing the target image into a plurality of areas each having the mosaic block size; and
    setting the object as a mosaic block by reflecting a color of each divided area in the object.

2. The method of claim 1, wherein the object acquisition comprises:
    extracting the object to be used in the mosaic from a selected area of the received image;
    acquiring representative values of a signal indicating colors of the object; and
    setting a color property for the extracted object by combining the representative values.

3. The method of claim 1, wherein the setting of the object as a mosaic block comprises:
    acquiring representative values of a signal indicating colors of each divided area;
    reflecting the representative values of a signal indicating colors of each divided area in the object to be applied to each divided area; and
    setting the object reflecting the representative values of a signal indicating colors of each divided area as a mosaic block.

4. The method of claim 2, wherein the signal indicating color is a color signal including Red (R), Green (G) and Blue (B).

5. The method of claim 3, wherein the signal indicating color is a color signal including Red (R), Green (G) and Blue (B).

6. The method of claim 2, wherein the representative values acquisition comprises:
   computing histograms of R, G, and B values of the extracted object or each divided area; and
   setting level values having highest proportions in the histograms as representative values of the R, G, and B colors.

7. The method of claim 3, wherein the representative values acquisition comprises:
   computing histograms of R, G, and B values of the extracted object or each divided area; and
   setting level values having highest proportions in the histograms as representative values of the R, G, and B colors.

8. An apparatus for performing mosaic processing on an original image, comprising:
   an object image extractor for extracting from a selected area of an image an object to be used in a mosaic;
   an object modeler for analyzing a property of the object received from the object image extractor and storing information about the property of the object in a storage medium;
   an image analyzer for analyzing an image property for each divided area of the original image; and
   a mosaic image generator for receiving at least one object selected from among objects stored in the storage medium and generating a mosaic image by reflecting the image property of each divided area in the selected object.

9. The apparatus of claim 8, wherein the object modeler acquires representative values of a signal indicating colors of the object, and sets a color property for the extracted object by combining the representative values.

10. The apparatus of claim 8, wherein the image analyzer acquires representative values of a signal indicating colors of each divided area and the mosaic image generator generates a mosaic block by reflecting the representative values of the signal indicating colors of each divided area in the selected object.

11. The apparatus of claim 9, wherein the object modeler computes histograms of Red (R), Green (G), and Blue (B) values of the extracted object and sets level values having highest proportions in the histograms as representative values of the R, G, and B colors of the object, and the image analyzer computes histograms of R, G, and B values of each divided area and sets level values having highest proportions in the histograms as representative values of the R, G, and B colors of each divided area.

12. The apparatus of claim 10, wherein the object modeler computes histograms of Red (R), Green (G), and Blue (B) values of the extracted object and sets level values having highest proportions in the histograms as representative values of the R, G, and B colors of the object, and the image analyzer computes histograms of R, G, and B values of each divided area and sets level values having highest proportions in the histograms as representative values of the R, G, and B colors of each divided area.

* * * * *